Nov. 4, 1941.   W. J. BROWN ET AL   2,261,828

THERMOMETER

Filed Feb. 27, 1941

INVENTORS.
WILLIAM J. BROWN
BY EVAN A. EDWARDS

ATTORNEY.

Patented Nov. 4, 1941

2,261,828

UNITED STATES PATENT OFFICE 2,261,828

THERMOMETER

William J. Brown and Evan A. Edwards, Rochester, N. Y., assignors to Taylor Instrument Companies, Rochester, N. Y., a corporation of New York Application February 27, 1941, Serial No. 380,906

5 Claims. (Cl. 73—374)

This invention relates to a thermometer, and more particularly to a thermometer of the glass type having its indicating tube section protected by a glass enclosure, hermetically sealed to a metal casing which serves to protect the connecting tube section and bulb of the thermometer.

It is especially desirable in many field of use of a glass thermometer, particularly in the dairy industry, that it be possible for the thermometer assembly to be completely immersed in a cleansing or sterilizing liquid without the liquid leaking into the interior of the thermometer case. Since the indicating section of the glass thermometer must be visible, it is therefore a feature of the invention to protect the thermometer by a transparent protective dome extending over the indicating section of the thermometer tube, while the connecting portion of the tube and the bulb thereof are enclosed in a metal casing, the metal casing being sealed to the margin of the glass dome.

Another feature of the invention relates to the method of hermetically joining a mass of metal, such as stainless steel, to the edge of a relatively thick mass of glass.

Figure 1:
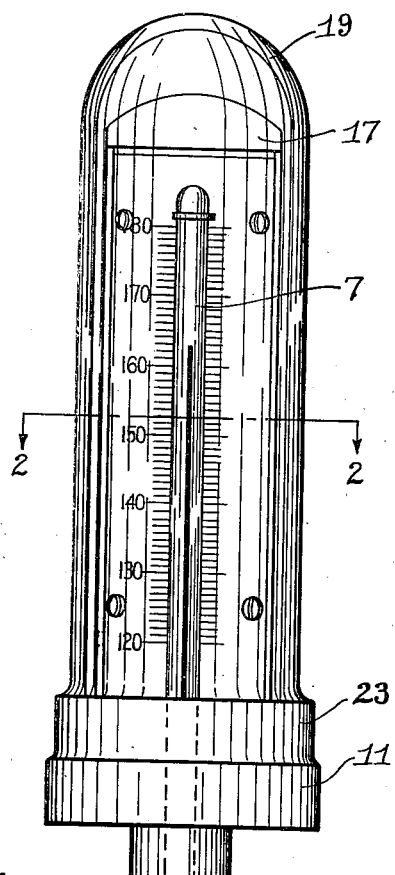
Figure 2:
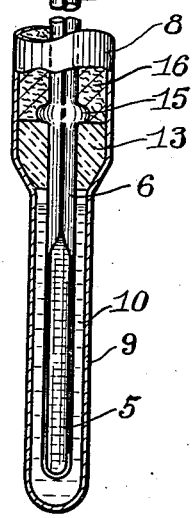
Figure 2:
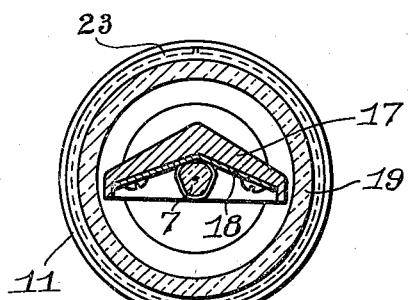
Figure 3:
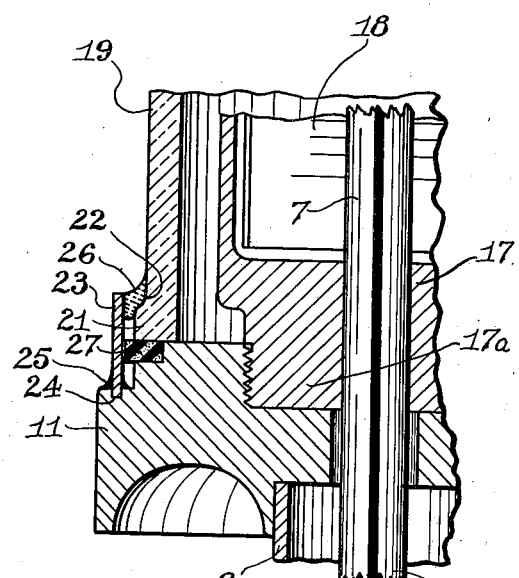

For an understanding of the invention reference is made to the following description and claims when taken with the drawing in which Fig. 1 is a front view of the present thermometer with portions thereof broken away for clearness in disclosure; Fig. 2 is a cross section on the line 2—2 of Fig. 1; and Fig. 3 is an enlarged vertical section of a fragment of the thermometer, especially showing the sealed joint construction.

The thermometer assembly of the present invention includes a glass thermometer comprising a bulb 5 having therein a thermosensitive liquid, such as mercury. The bulb communicates with a connecting or capillary tube section 6 and an indicating capillary tube section 7, the indicating tube section being sealed at its upper end in accordance with the well-known practice. The bulb and the connecting tube section of the thermometer are encased in a protective tubular stem 8 formed of a metal, such as stainless steel (also known as 18–8 alloy). This stem is provided with an integral bulb portion 9 of reduced cross section and closed at its free end. The open end of the stem 8 is welded or otherwise joined to an annular base 11. It will be understood that the connecting section 6 of the thermometer tube passes through the aperture in the base 11 into the metal stem 8 with the bulb 5 in spaced relation to the bulb portion 9 of the stem. The space between the bulb 5 of the thermometer and the bulb portion 9 of the stem contains mercury 10 or the like, which serves as a heat-conducting medium between the metal stem and the thermometer bulb. The mercury is sealed in the bulb portion of the stem by a suitable washer 13 of impregnated felt material, which is engaged by a bead 15 integral with the thermometer tube. The remaining space in the casing may be filled with an asbestos rope packing 16.

The indicating section 7 of the glass thermometer stem is secured to a scale support 17 of the cross section indicated in Fig. 2. This scale support is externally threaded at its lower end 17a to engage the internally threaded aperture through the annular base 11. The support 17 has mounted thereon a graduated scale plate 18, the upper end of the indicating section of the thermometer being secured in proper indicating relation to the scale plate 18.

In accordance with the present invention it is proposed to make this thermometer assembly gas-tight and water-tight. For this purpose, a tubular dome 19 of "Pyrex" glass or the like is applied over the scale support and the indicating section 7 of the glass thermometer. The free edge of the glass dome rests on and is hermetically sealed to the metal base 11 by a fused metal joint. A rubber gasket 27 between the fuse and the edge of the dome provides a supplemental seal. Owing to the large mass of metal forming the base and due to the necessary thickness of the margin of the glass dome, it has been impossible prior to this invention, to secure the glass and metal together by a reliable joint. In the present arrangement, the tubular glass dome is provided with a lip 21, the surface 22 of which is metallized. According to the method of metallizing this surface, the lip is heated to redness or, in other words, to a temperature at which the metal will "wet" the glass. At this high temperature, metal, such as bronze or aluminum, is sprayed on the hot glass so that a layer of metal is actually incorporated into the glass at the surface 22 of the tube.

Since the metal of the base and the glass of the tube have different coefficients of expansion, novel means has been devised for joining these two parts together so that the joint therebetween will not be disrupted when the thermometer assembly is subjected to extreme heat and cold.

The joint of the present invention includes a split ring 23 of Invar or the like, the ring being of such diameter that it will freely receive the lip of the glass dome. One edge of this Invar ring is received in an annular groove 24 in the upper surface of the base, the ring being attached to the base by solder 25 substantially filling the space between the groove and the Invar ring. The other edge of the Invar ring is soldered, as at 26, to the metallized surface 22 of the lip of the glass dome and the ends of the ring are soldered together.

While the joints between the base, the Invar ring and the metallized lip of the dome have been herein illustrated as formed by soldering, it will be understood that these joints may be formed by welding, brazing or the like. The expression "fused metal joint" is intended to cover all of these procedures.

From this construction it will be appreciated that the junction of the glass with the Invar ring is spaced from the junction of this Invar ring with the metal base, so that the strains due to unequal expansion of the glass and stainless steel are distributed.

We claim:

1. In a device of the class described, a glass thermometer comprising a bulb containing a thermosensitive liquid, a connecting capillary tube section communicating with said bulb and an indicating capillary tube section sealed at one end and having its other end communicating with said first section, a tubular metal casing sealed at one end, said thermometer being mounted in said casing with the bulb positioned adjacent the closed end of said casing and with the indicating section projecting therefrom, a glass dome enclosing said indicating section, the free edge of the glass dome being coated with metal, and means including a fused metal joint sealing the entire coated edge of the dome to the entire edge of the open end of the casing.

2. In a device of the class described, a glass thermometer comprising a bulb containing a thermosensitive liquid, a connecting capillary tube section communicating with said bulb and an indicating capillary tube section sealed at one end and having its other end communicating with said first section, a tubular metal casing sealed at one end, said thermometer being mounted in said casing with the bulb positioned adjacent the closed end of the casing and with the indicating section projecting therefrom, a glass dome enclosing said indicating section, the free edge of the glass of said dome being metallized, and means including a pair of spaced fused metal joints sealing the entire metallized edge of the dome to the entire edge of the open end of the casing.

3. In a device of the class described, a glass thermometer comprising a bulb containing a thermosensitive liquid, a connecting capillary tube section communicating with said bulb and an indicating capillary tube section sealed at one end and having its other end communicating with said first section, a tubular metal casing sealed at one end, said thermometer being mounted in said casing with the bulb positioned adjacent the closed end of the casing and with the indicating section projecting therefrom, a glass dome enclosing said indicating section, the free edge of the glass of said dome being metallized, and means including a pair of spaced fused metal joints connected by low expansion metal for sealing the entire metallized edge of the dome to the entire edge of the open end of the casing.

4. In a device of the class described, a glass thermometer comprising a bulb containing a thermosensitive liquid, a connecting capillary tube section communicating with said bulb and an indicating capillary tube section sealed at one end and having its other end communicating with said first section, a tubular metal casing sealed at one end, an annular metal base integrally joined to said casing with the openings through said base and said casing in registry, said base having in the surface thereof opposite said casing an annular groove enclosing the opening through said base, a band of Invar having one of its edges connected by a fused metal joint to said base, said thermometer being mounted in said casing with the bulb positioned adjacent the closed end of the casing and with the indicating section projecting therefrom, a glass dome enclosing said indicating section, the free edge of the glass of said dome being metallized, and a fused metal joint sealing the other edge of said band to the edge of said dome.

5. In a device of the class described, a glass thermometer comprising a bulb containing a thermosensitive liquid, a connecting capillary tube section communicating with said bulb and an indicating capillary tube section sealed at one end and having its other end communicating with said first section, a tubular metal casing sealed at one end, an annular metal base integrally joined to said casing with the openings through said base and said casing in registry, said base having in the surface thereof opposite said casing an annular groove enclosing the opening through said base and having a scale support projecting therefrom along the main axis of said casing, a band of Invar having one of its edges connected by a fused metal joint to said base, said thermometer being mounted in said casing with the bulb positioned adjacent the enclosed end of the casing and with the indicating section projecting therefrom in front of said scale support, a glass dome enclosing said indicating section, the free edge of the glass of said dome being metallized, and a fused metal joint sealing the other edge of said band to the edge of said dome.

WILLIAM J. BROWN.
EVAN A. EDWARDS.